(12) United States Patent
Hansen (10) Patent No.: US 7,091,949 B2
(45) Date of Patent: *Aug. 15, 2006

(54) COMPUTER PRESENTATION SYSTEM AND METHOD WITH OPTICAL TRACKING OF WIRELESS POINTER

(76) Inventor: Karl C. Hansen, 6821 Wildlife Dr., Stillman Valley, IL (US) 61084

( * ) Notice: Subject to any disclaimer, the term of this patent is extended or adjusted under 35 U.S.C. 154(b) by 0 days.

This patent is subject to a terminal disclaimer.

(21) Appl. No.: 09/906,218

(22) Filed: Jul. 16, 2001

(65) Prior Publication Data

US 2001/0045940 A1 Nov. 29, 2001

Related U.S. Application Data

(63) Continuation of application No. 09/347,761, filed on Jul. 6, 1999, now Pat. No. 6,275,214.

(51) Int. Cl.
*G09G 5/08* (2006.01)

(52) U.S. Cl. ........................ 345/158; 345/157

(58) Field of Classification Search ......... 345/156–184
See application file for complete search history.

(56) References Cited

U.S. PATENT DOCUMENTS

| | | | |
|---|---|---|---|
| 4,593,157 A | 6/1986 | Usdan | |
| 4,731,811 A | 3/1988 | Dubus | |
| 4,827,500 A | 5/1989 | Binkerd et al. | |
| 5,138,304 A | 8/1992 | Bronson | |
| 5,204,894 A | 4/1993 | Darden | |
| 5,222,121 A | 6/1993 | Shimada | |
| 5,452,340 A | 9/1995 | Engelbeck et al. | |
| 5,483,579 A | 1/1996 | Stogel | |
| 5,502,459 A | 3/1996 | Marshall et al. | |
| 5,504,805 A | 4/1996 | Lee | |
| 5,509,049 A | 4/1996 | Peterson | |
| 5,515,040 A | 5/1996 | Lee et al. | |
| 5,515,079 A | 5/1996 | Hauck | |
| 5,572,251 A | 11/1996 | Ogawa | |
| 5,712,658 A | 1/1998 | Arita et al. | |
| 5,758,021 A | 5/1998 | Hackbarth | |
| 5,914,783 A | 6/1999 | Barrus | |
| 5,926,168 A | 7/1999 | Fan | |
| 6,050,690 A | 4/2000 | Shaffer et al. | |
| 6,275,214 B1 | 8/2001 | Hansen | |

(Continued)

FOREIGN PATENT DOCUMENTS

FR   2 731 290 A1   9/1996
JP   07-319616   * 12/1995

(Continued)

OTHER PUBLICATIONS

"Detailed Description", Translation of JP409080372A.*

(Continued)

*Primary Examiner*—Alexander Eisen
(74) *Attorney, Agent, or Firm*—Brooks Kushman P.C.

(57) ABSTRACT

A method for interfacing with a computer through a projected display of the computer using a laser pointer includes processing an image of the projected display captured by a camera, determining position of a laser pointer spot on the projected display, generating commands to position a computer mouse pointer at a screen position corresponding to the projected display, and generating a mouse click for the computer when a programmable laser pointer event occurs. Commands may be used to emulate control of the computer typically provided by a pointing device such as a mouse or track ball.

25 Claims, 2 Drawing Sheets

U.S. PATENT DOCUMENTS 6,317,118 B1 * 11/2001 Yoneno .................. 345/158
6,323,839 B1 * 11/2001 Fukuda et al. ............ 345/157

FOREIGN PATENT DOCUMENTS

JP            409080372 A     3/1997
JP            09-222951      *   8/1997

OTHER PUBLICATIONS

S. Elrod et al., "Liveboard: A Large Interactive Display Supporting Group Meetings, Presentations and Remote Collaboration", CHI '92, 1992 ACM 0-89791-513-5/92/0005-0599, May 3-7, 1992, pp. 599-607.

* cited by examiner

COMPUTER PRESENTATION SYSTEM AND METHOD WITH OPTICAL TRACKING OF WIRELESS POINTER

CROSS-REFERENCE TO RELATED APPLICATION

This application is a continuation of application Ser. No. 09/347,761 filed on Jul. 6, 1999, entitled "Computer Presentation System And Method With Optical Tracking Of Wireless Pointer" now U.S. Pat. No. 6,275,214.

TECHNICAL FIELD

The present invention relates to a system and method for remotely controlling a computer by optically tracking and synchronizing a wireless optical pointer with a projected image of the computer screen.

BACKGROUND ART

A number of systems and methods for remotely controlling a computer have been developed to adapt the conventional keyboard/mouse interface to a wide variety of user applications and preferences. A variety of technologies including ultrasonic, infrared, and radio frequency (RF) have been used to afford users increased mobility relative to the computer processor and/or display screen. These technologies typically employ custom transmitters/receivers to communicate control and status information between the user and the computer which may be used to control the computer. A number of systems use sensors positioned on the user, on the computer, and/or on a display screen to detect movement of the user and/or a wireless pointing device relative to the sensors. While acceptable for certain applications, these techniques may be limited by line-of-sight requirements or distance, for example. Likewise, these systems require complex and often expensive equipment which may not be readily adaptable to different forums having audiences ranging from a few individuals to a filled auditorium.

As computers are increasingly being used for graphical presentations and/or demonstrations, larger display devices are used to provide viewing by audiences of varying size. Many presentations, such as slide shows and the like, require relatively simple control of the computer during the actual presentation. Commands which advance or reverse slides or initiate a display sequence require only a basic user interface or remote control to communicate with the computer. However, more sophisticated presentations or demonstrations, such as used for software user training or promotion, require a more sophisticated interface or remote control to effectively operate the computer. Conventional strategies require the presenter to either remain within close proximity of the computer to operate the keyboard and/or pointing device (mouse, touchpad, track ball, etc.) or have an assistant perform the required operations.

DISCLOSURE OF INVENTION

Thus, it is an object of the present invention to provide a system and method for remotely controlling a computer in a similar manner as performed by a conventional pointing device.

Another object of the present invention is to provide a system and method for remotely controlling a computer based on characteristics of an optical pointer used to superimpose a cursor or visual cue onto a projected image of a computer screen.

A further object of the present invention is to provide a system and method for synchronizing position and/or movement of a cursor on a computer screen with position and/or movement of an optical pointer.

An additional object of the present invention is to provide a system and method for detecting characteristics of an optical pointer, such as shape, color, intensity, motion, or similar characteristics relative to a computer display to provide commands to a computer.

Yet another object of the present invention is to provide a system and method for remotely controlling a computer using position-related commands corresponding to characteristics of an optical cursor superimposed on a computer display.

A still further object of the present invention is to provide a system and method for connectionless optical tracking of light in conjunction with a computer to emulate a conventional computer pointing device.

In carrying out the above objects and other objects, features, and advantages of the present invention, a method for visual interaction with a computer through its projected display includes processing an image of the projected display captured by a camera, determining position of a laser pointer spot on the projected display, generating commands to position a computer mouse pointer at a screen position corresponding to the projected display, and generating a mouse click for the computer when a programmable laser pointer event occurs. In one embodiment, the invention includes a computer connected to a projector which projects an image of the computer output onto an external screen. A camera is used to capture an image of the projected computer output. An optical pointer, such as a laser pointer, is used to generate and transmit an external cursor having various properties, such as color, shape, or intensity. The image captured by the camera is used to detect and process at least one property of the external cursor to generate a corresponding command or commands to control the computer. Commands may be used to emulate control of the computer typically provided by a pointing device such as a mouse, track ball, or the like.

The present invention provides a number of advantages relative to prior art strategies. For example, the present invention allows the user to utilize a conventional optical pointing device, such as a laser pointer, to provide position dependent commands to a remotely located computer. As such, the present invention provides a relatively simple remote user interface capable of more sophisticated control of the computer, similar to a conventional computer pointing device, such as a mouse or track ball. The present invention permits a user to control a computer for a software demonstration from any location where the computer screen or a projected image of the computer screen is accessible via an optical pointer. In one embodiment, the present invention integrates a projector and video camera and/or frame capture device within a single unit.

The above advantages and other advantages, objects, and features of the present invention, will be readily apparent from the following detailed description of the best mode for carrying out the invention when taken in connection with the accompanying drawings.

BEST MODE FOR CARRYING OUT THE INVENTION

Figure 1:
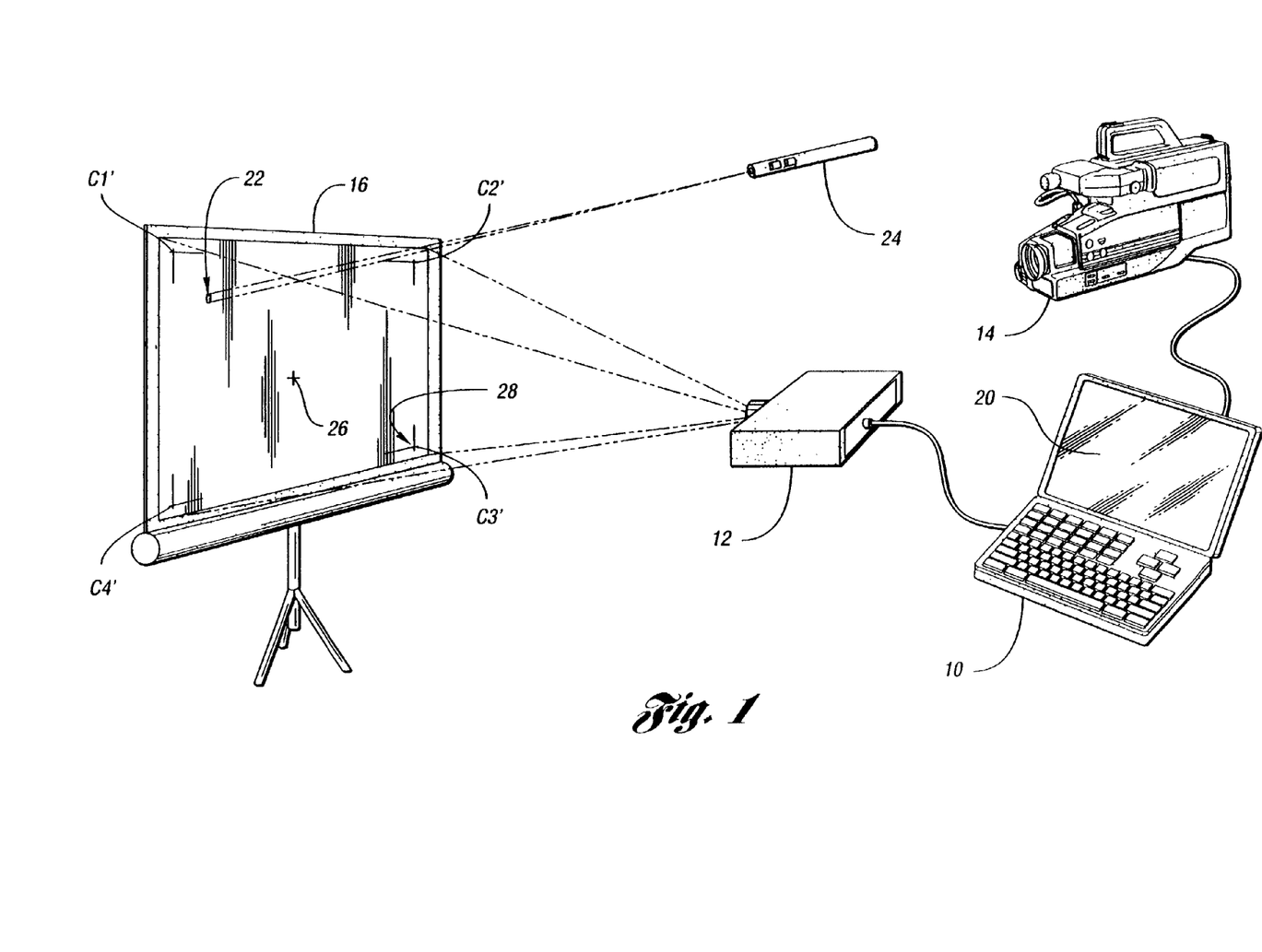
FIG. 1 is a block diagram illustrating a representative computer presentation system with optical tracking for remotely controlling the computer according to the present invention.

Referring now to FIG. 1, a block diagram illustrating a representative computer presentation system with optical tracking for remotely controlling the computer according to the present invention is shown. As used herein, the remote control of the computer is intended to include control of various application programs and/or the operating system of the computer. In this embodiment, computer 10 is connected to a video projector 12 and a video camera 14. Video projector 12 projects an image 16 of the computer output onto a projection surface or screen, indicated generally by reference numeral 18. Preferably, screen 18 is a "passive" screen, i.e. a substantially planar surface remotely located from computer 10 and of a light color to provide sufficient contrast to the image of computer output generated by projector 12. Various objects may be used to provide such a surface, including projection screens, walls, or the like. Output from computer 10 may also be displayed on an "active" screen which would include a traditional computer screen 20 of laptop computer 10, or any other display device such as a monitor, television, or similar "active" device. Such "active" screens may be used alone, or in combination with one or more "passive" screens without departing from the spirit or scope of the present invention.

As also illustrated in FIG. 1, an external cursor, indicated generally by reference numeral 22, is superimposed on image 16 which is output from computer 10. As used in this application, an external cursor is one which is generated externally relative to computer 10, i.e. generated by some other device which could include another computer, projector, or the like. In one embodiment, external cursor 22 is generated by a hand-held optical pointer 24 which has the capability of varying at least one property of external cursor 22. For example, optical pointer 24 may vary the color, shape, size, intensity, illumination pattern, motion, and/or position of external cursor 22 to generate one or more commands to remotely control computer 10 according to the present invention. In one preferred embodiment, optical pointer 24 is a laser pointer which generates an external cursor in one of two user-selectable colors. In this embodiment, the external cursor has a significantly higher intensity than the output of the computer and is therefore more easily detected.

Preferably, camera 14 captures an image including at least a substantial portion of image 16 generated by projector 12. In an alternative embodiment where an active screen is utilized, camera 14 preferably captures at least a substantial portion of the active screen, i.e. computer monitor, display, or television. Computer 10 processes the captured image to determine at least one property of external cursor 22. In a preferred embodiment of the present invention, computer 10 processes image 16 to determine at least the position of external cursor 22 and generates an appropriate command or commands to move an internal cursor 26 to approximately the same position as external cursor 24. Computer 10 may also process image 16 to detect various other properties of external cursor 22 to generate position-dependent commands which are used to remotely control computer 10. Such position or context-dependent commands may emulate a "left-click" or "right-click" command generated by a traditional computer pointing device, such as a mouse, track ball, touch pad, or the like. Likewise, various other commands may be associated with one or more properties of external cursor 22 depending upon the particular application.

In one embodiment of the present invention, computer 10 may periodically generate reticles or fiducials, indicated generally by reference numeral 28, to calibrate or register the image captured by camera 14 relative to image 16 on screen 18. Preferably, each of the four corners of the image of the computer output contains a reticle or fiducial and the fiducials are used to delineate the "active" tracking region where external cursor 22 is detected. The fiducials may be any appropriate shape such as a right-angle or cross as illustrated. For applications where screen 18 is not substantially planar, fiducials 28 should cover more of the screen. For example, fiducial lines may extend horizontally or vertically across screen 18.

Preferably, projector 12 (when used), camera 14, and screen 18 are stationary and remain substantially fixed to facilitate the calibration (registration) and tracking process. However, the present invention could also be used in applications where one or more of these devices changes position, although detection of the properties of external cursor 22 becomes more complex and computationally intensive. The calibration or registration process may be repeated automatically at predetermined intervals, based on a user request, and/or when external cursor 22 is not detected. In one embodiment of the present invention, reticles or fiducials 28 are progressively moved toward the position of external cursor 22 to simplify processing of the image to detect external cursor 22. In this embodiment, only the area delineated by fiducials 28 is searched or scanned to detect external cursor 22. If external cursor 22 is not located within the area defined by fiducials 28, their position is either reset to, or progressively expanded toward, the original corners of the processed image until external cursor 22 is detected.

Figure 2:
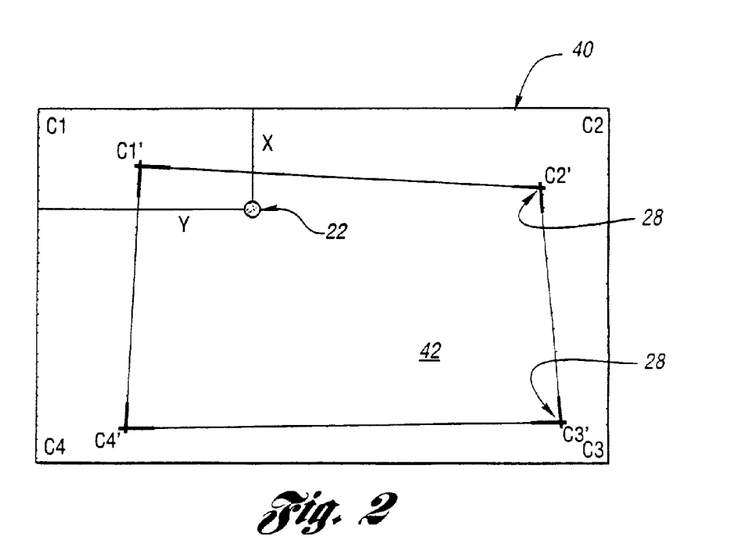
FIG. 2 is a diagram illustrating projection of calibration reticles or fiducials and derivation of coordinates for an external cursor of one embodiment according to the present invention.

FIG. 2 represents a single image frame 40 captured by video camera 14. Preferably, frames are repeatedly captured and processed to detect at least one property of external cursor 22. Typical frame capture rates are thirty or sixty frames per second. Preferably, the frame capture rate of the video camera and/or the output of an active screen or projector are selected to minimize aliasing and other interference within the frequency bands of interest. Such interference may be produced by the beat frequency or difference frequency between the refresh rate of the screen or projector and the video camera. Any such interference effects may also be reduced by appropriate filtering of the captured image. Filtering may be performed as part of the image processing by the computer, or may be performed by appropriate hardware as part of the image capture process.

Captured image frame 40 preferably includes a substantial portion of the computer output image, represented generally by reference numeral 42. As illustrated in FIG. 2, computer output image 42 may occupy a convex quadrilateral area within captured frame 40. Image 42 will not be rectangular if either or both of the projector and the camera are not located on the line which passes perpendicularly through the center of the screen. Preferably, the computer embeds or superimposes the reticles or fiducials 28 within image 42. Processing of captured image 40 may utilize line and intersection pattern recognition depending upon the particular type of fiducials utilized to locate corners C1', C2', C3', and C4'. Determination of the locations of C1', C2', C3', and C4' and the properties of the external cursor is simplified because their identifying characteristics are known a priori. Identification of items within a static image and identification of dynamic motion of features may be accomplished using any number of known image processing techniques, such as those described in "MACHINE VISION" by Jain, Kasturi, and Schunk, published by McGraw-Hill, ISBN 0-07-032018-7. The present invention is independent of the particular image processing techniques utilized to identify or detect the properties of the external cursor used to remotely control the computer. An exemplary method for determining position or location information of the external cursor is provided below.

The locations of corners C1', C2', C3', C4', and external cursor 22 may be determined for a classic video quadrant system having horizontal coordinates represented by X and vertical coordinates represented by Y, with Y=0 representing the topmost scan-line. The number of scan-lines determines the maximum Y value. The positions corresponding to the coordinates for X=0 are the first (left-most) pixel in each scan-line, and the number of pixels per scan-line determines the maximum X value. The line segment C1–C2 corresponds to the X-axis, and segment C1–C4 corresponds with the Y-axis. Points interior to image 42 are represented with normalized (T, U) coordinates where C1' has coordinates (T=0.0, U=0.0), and C3' has coordinates (T=1.0, U=1.0). The normalized coordinates can then be scaled to an appropriate resolution for image 40. Coordinates T and U can be determined for any point in a given video frame using a pair of parametric equations.

First, X-Y coordinate pairs for each of the corners C1' through C4' are represented as:

$C1'=(X1',Y1')$ $C2'=(X2',Y2')$ $C3'=(X3',Y3')$ $C4'=(X4',Y4')$

The parametric equation for a line is $P(Q)=P0-Q(P0-P1)$, where Q is replaced by T and then U in this example. The T-axis is defined using C1'–C2' and C4'–C3' while the U-axis is defined using C1'–C4' and C2'–C3'. Because the embedded quadrilateral defining image 42 is not guaranteed to have parallel boundaries, the mapping from (X,Y) to (T,U) is not a simple rectangular mapping in the general case. However, the mapping may be derived as described below.

The parametric equations for the embedded quadrilateral boundaries defining image 42 are given by:

Upper boundary $(LT1): p(T)=C1'-T(C1'-C2')$

Lower boundary $(LT2): p(T)=C4'-T(C4'-C3')$

Left boundary $(LU1): p(U)=C1'-U(C1'-C4')$

Right boundary $(LU2): p(U)=C2'-U(C2'-C3')$

The mapping in (T,U) may then be defined by selecting either the LT pair or the LU pair and defining a parametric equation in the other variable (either U or T, respectively) as follows:

$$p(T)=LU1-T(LU1-LU2) \quad \quad 1:$$

or, equivalently:

$$p(U)=LT1-U(LT1-LT2) \quad \quad 2:$$

Equation 1 represents how the U-axis scales and/or rotates as it traverses the (T,U) space from its location at T=0, to its location at T=1. Equation 2 represents how the T axis scales and/or rotates as it traverses the (T,U) space from U=0, to U=1. As indicated above, either equation may be used to determine a parametric equation in the other variable. In this example, Equation 1 is selected and the equations for LU1 and LU2 are substituted into Equation 1 to generate Equation 3 as follows:

$$p(T,U)=[C1'-U(C1'-C4')]-T\{[C1'-U(C1'-C4')]-[C2'-U(C2'-C3')]\} \quad \quad 3:$$

To simplify the notation, it is useful to define a shorthand notation representing the differences or deltas between coordinates of the corner points as follows:

$d1: C1'-C2'$ $d2: C2'-C3'$ $d3: C4'-C3'$ $d4: C1'-C4'$

Where a difference value applies to the difference between values of only one coordinate, i.e. only the X or only the Y coordinate values, the difference is represented by either an X or Y, respectively, between the "d" and the number. For example, dX2 represents the quantity (X2'–X3'), while dY4 represents the quantity (Y1'–Y4'). The (X',Y') point pairs are then substituted for C1', C2', C3', and C4' in Equation 3, with the delta notation used to simplify the resulting equations. Depending upon how the four points multiplied by U are paired, one of the following equations results:

$$p(T,U)=[C1'-U*d4]-T[d1-U(d1-d3)] \quad \quad 4:$$

or $$p(T,U)=[C1'-U*d4]-T[d1-U(d4-d2)] \quad \quad 5:$$

Equations 4 and 5 are equally valid and each represents a pair of linearly independent equations, one in X and the other in Y because p(T,U) is represented by a generic coordinate pair (X, Y). Equation 5 is selected for this example and split into the X and Y equations:

$$X=X1'-U*dX4-T*dX1+UT(dX4-dX2) \quad \quad 6:$$

$$Y=Y1'-U*dY4-T*dY1+UT(dY4-dY2) \quad \quad 7:$$

Equations 6 and 7 are then solved for T and U, respectively, to produce equations 8 and 9 as follows:

$$8: T = \frac{X1'-X-U*d4}{dX1-U(dX4-dX2)}$$

$$9: U = \frac{Y1' - Y - T*dY1}{dY4 - T(dY4 - dY2)}$$

Because Equations. 8 and 9 are linearly independent, either equation can be substituted into the other. In this example, Equation 9 is substituted into Equation 8 to obtain:

$$10: T = \frac{X1' - X - dX4\frac{Y1' - Y - T*dY1}{dY4 - T(dY4 - dY2)}}{dX1 - (dX4 - dX2)\frac{Y1' - Y - T*dY1}{dY4 - T(dY4 - dY2)}}$$

Which is now only an equation in T for an arbitrary point having coordinates (X,Y) in the original space. Solving Equation 10 for T yields a simple quadratic in T:

$$11: 0 = AT^2 + BT + C$$

where $$A = dY1(dX4-dX2) - dX1(dY4-dY2)$$

$$B = dX1*dY4 - (Y1-Y)(dX4-dX2) - dY1*dX4 + (X1-X)(dY4-dY2)$$

$$C = dX4*(Y1-Y) - dY4(X1-X)$$

Equation 11 may then be solved using the quadratic formula. In Equation 11, A is constant, while B and C vary depending upon the values of X and Y. As such, if the lines formed by extending the segments C1'–C2' and C4'–C3' intersect, there will be two solutions to Equation 11, one of which is the T coordinate of the point of intersection, the other of which is the correct value for T. If the lines do not intersect, the single solution will be the correct value for T. Once the correct value of T is determined, it is back-substituted into equation 9 to determine the corresponding value for U.

The above example demonstrates that once C1', C2', C3', and C4' are known, and the (X,Y) coordinates of external cursor 22 are determined, a straight-forward computation yields values for (T,U) which represent the "mouse coordinates" for internal cursor 26 of the computer output. Because the T-U coordinate system has been normalized, any coordinates with T or U outside of the normalized range (0 to 1) can be ignored for tracking purposes because they do not fall within image 42 of computer output. To determine the scaled values for the coordinates of internal cursor 26, T is multiplied by the horizontal resolution and U is multiplied by the vertical resolution of the captured image 40. Once the calibration or registration process has determined C1', C2', C3', and C4', at least one property of external cursor 22 is monitored or tracked by repeatedly capturing and analyzing frames as illustrated and described with reference to FIG. 3. In one embodiment of the present invention, position of external cursor 22 is determined only while external cursor 22 is within projected image 42 while various other properties of external cursor 22, such as shape, color, size, etc. are monitored as long as external cursor 22 is within captured image 40, i.e. even when external cursor 22 is outside of projected image 42.

Figure 3:
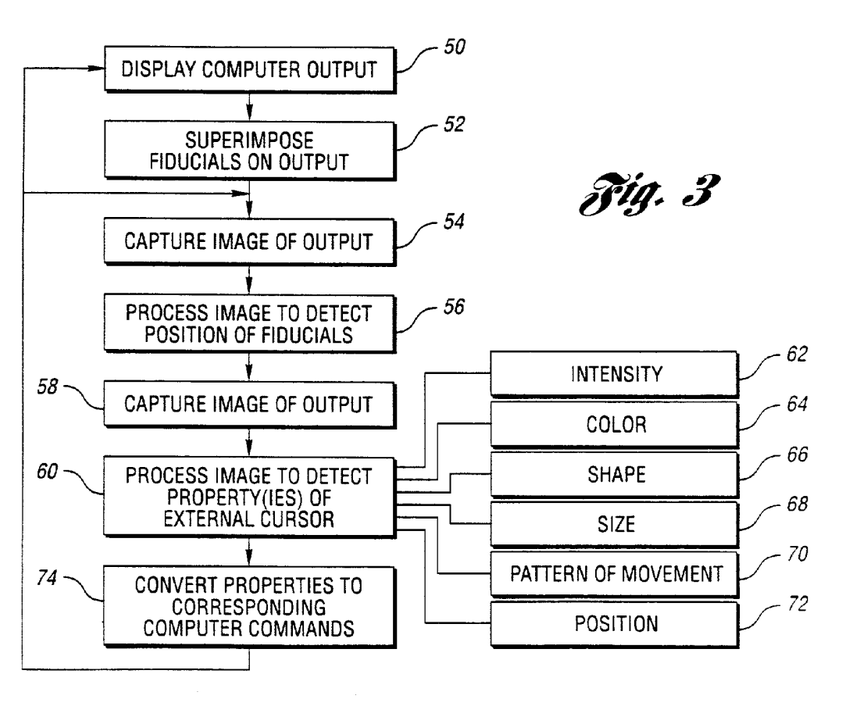
FIG. 3 is a flow chart illustrating operation of a system or method for remotely controlling a computer using optical tracking of an external cursor according to the present invention.

Referring now to FIG. 3, a flowchart illustrating operation of one embodiment of a system and method for remotely controlling a computer according to the present invention is shown. As will be appreciated by one of ordinary skill in the art, the flowchart illustrated in FIG. 3 may represent any of a number of known processing strategies such as event-driven, interrupt-driven, multi-tasking, multi-threading, and the like. Similarly, the present invention is independent of the particular programming language, operating system, or computer platform which may be used to implement the invention. As such, various steps or functions illustrated may be performed in the sequence illustrated, in parallel or in some cases omitted altogether. Likewise, the order of processing illustrated is not necessarily required to achieve the objects, features, and advantages of the invention, but is provided for ease of illustration and description.

Preferably, the control logic of FIG. 3 is implemented in software which is executed by a microprocessor-based computer, such as a laptop or desktop computer, represented generally by computer 10 of FIG. 1. Of course, various portions or functions of the control logic may be implemented in software, hardware, or a combination of software and hardware. The flowchart of FIG. 3 illustrates one "loop" and its operations are preferably repeated at periodic time intervals or as required by some internal or external event, as known by those of skill in the art. Preferably, control logic represented in FIG. 3 is embodied in data stored on a computer readable storage medium, such as a floppy disk, hard disk, CD-ROM, tape, or other magnetic, optical or combination device. The computer readable storage medium includes data representing instructions executable by a computer to generate commands for remotely controlling a computer according to the present invention.

Output from a computer is displayed as represented by block 50 of FIG. 3. Preferably, output from the computer is displayed on an associated screen which may be a computer monitor, external television or monitor, or an external "passive" screen as described above. A plurality of fiducials or reticles are superimposed on the computer output as represented by block 52. Preferably, the fiducials are generated by the computer and superimposed on the output. The fiducials are used for registration or calibration of the system. Preferably, the fiducials are positioned in the corners of the computer output and the shape of the fiducials is known a priori to the system. Step 52 may be periodically repeated depending upon the particular application. For example, step 52 may be initiated by the user to calibrate the system, or automatically repeated at predetermined time intervals, or repeated based on some internal or external event. For example, block 52 may be repeated whenever the external cursor is not detected within the image.

An image of the computer output is captured as represented by block 54. Preferably, a camera which includes a CCD array is used in conjunction with an appropriate frame capture card to capture the image. Preferably, the image includes a substantial portion of the computer output. However, depending upon the particular implementation, the image may include only the central portion or some other region of the screen used to display the computer output. Alternatively, the image may encompass the entire screen used to display the computer output.

The image is processed to detect position of the fiducials as represented by block 56. As indicated above, the operations represented by blocks 52 and 56 may be selectively repeated under various circumstances. Preferably, one of the fiducials is utilized as the origin for a normalized coordinate system to determine position of the external cursor relative to the computer output as described above.

After completing the calibration or registration process, images are repeatedly captured and processed as represented by blocks 58–72. A captured image, represented by block 58, is processed to detect at least one property of an external cursor as represented by block 60. Preferably, the external cursor is an optical cursor generated by a hand-held pointer and includes at least one user selectable (changeable) property. The selectable property or properties of the cursor are used to remotely control the computer. Cursor properties may include intensity, color, shape, or size, as represented by blocks 62, 64, 66, and 68, respectively. In addition, cursor properties may include a particular pattern of movement as represented generally by reference 70. Position of the external cursor, represented by block 72 is preferably also detected relative to the position of the fiducials as determined by block 56. In addition, any one or more of the properties may be used in combination to generate appropriate commands for the computer. For example, the position of the external cursor, represented by block 72, may be used in combination with the color or shape of the cursor which is represented by blocks 64 and 66 respectively, i.e., the color and/or shape of the external cursor generate different commands based on the position of the cursor.

The property or properties of the external cursor which are detected by block 60 are converted to corresponding commands to control the computer as represented by block 74. This may be accomplished by any of a number of known strategies. For example, a data structure may be used to associate various properties or combinations of properties with corresponding commands in a particular software application. Of course, the particular commands generated may vary from one application to another. Preferably, the commands generated by block 74 control movement of the internal cursor generated by the computer such that movement of the external cursor generated by the pointer causes movement of the internal cursor generated by the computer to synchronize movement of the cursors. In addition, various context-sensitive or position-sensitive commands may be generated by varying one or more properties for a particular position of the external cursor.

The following provides a representative use of one embodiment of the present invention which includes a hand-held laser pointer with three aligned laser emitters arranged as an isosceles triangle. One emitter of the pointer is active at all times once the pointer is turned on. A second emitter is selectively activated by the user by pressing a first button which results in a command corresponding to a "left-mouse-button-click" command. All three emitters are selectively activated by the user by pressing a second button on the laser pointer which results in a command corresponding to a "right-mouse-button-click" command. In this embodiment, various properties including the intensity, color, and pattern (or shape) of the external cursor generated by the laser pointer are used to determine location of the external cursor in addition to which button (if any) is being depressed. When no buttons are pressed, a single high-intensity cursor in the shape of a dot, the color of the first emitter, is visible within the captured image frame. When the first button is pressed, the shape and color of the external cursor is changed in that a second dot appears located at some distance from the first dot. When the second button is pressed, the external cursor takes yet another shape and color consisting of two additional dots which appear as the remaining points of the isosceles triangle. The properties of the external cursor are detected and processed by the system to generate corresponding commands to remotely control the computer.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for interfacing with a computer through a projected display of the computer using a laser pointer, the method comprising:
   processing an image of the projected display captured by a camera;
   determining position and at least one of a plurality of user selectable properties of a laser pointer spot on the projected display;
   generating commands to position a computer mouse pointer at a screen position corresponding to the position of the laser pointer spot relative to the projected display; and
   generating at least one command to control the computer when a programmable laser pointer event occurs based on a change in one of the plurality of user selectable properties.

2. The method of claim 1 wherein the programmable laser pointer event comprises a change in the laser pointer spot color.

3. The method of claim 1 wherein the programmable laser pointer event comprises a change in the laser pointer spot shape.

4. The method of claim 1 wherein the programmable laser pointer event comprises a change in the laser pointer spot pattern of movement.

5. A method for interfacing with a computer through a projected display of the computer using a laser pointer as a pointing device for the computer with an image of the projected display captured by a camera in communication with the computer, the method comprising:
   superimposing a plurality of fiducials as calibration marks on the projected display to calibrate a camera;
   determining the position of the plurality of fiducials within the image and determining position of a laser pointer spot relative to at least one of the fiducials;
   processing the image of the projected display captured by the camera to move a computer mouse pointer to a position corresponding to the position of the spot generated by the laser pointer within the projected display; and
   processing the image of the projected display captured by the camera to generate at least one command for the computer based on detection of a pattern of movement of the laser pointer spot.

6. The method of claim 5 wherein the step of superimposing comprises moving the fiducials to expand a bounded region until the optical cursor is detected within the region bounded by the fiducials.

7. The method of claim 5 wherein the step of superimposing comprises moving the fiducials to reduce a bounded region surrounding output from the computer to reduce processing of the image.

8. A method for remotely controlling a computer using a laser pointer, the method comprising:
   projecting images using video output signals from the computer onto a remote surface;
   controlling the laser pointer to generate a spot on the remote surface;
   positioning and calibrating a camera in communication with the computer to capture the images projected on the remote surface;

processing the images using the computer to determine position and one of a plurality of properties of the spot generated by the laser pointer;

generating commands for the computer to position a computer mouse pointer at a location corresponding to the spot generated by the laser pointer so that the computer mouse pointer tracks the spot generated by the laser pointer;

processing the images to detect at least one property of the spot generated by the laser pointer to determine whether the property has changed; and generating commands to control functioning of the computer based on the at least one property of the spot of the laser pointer.

9. The method of claim 8 wherein the step of processing the images to generate commands comprises comparing positions of the spot generated by the laser pointer to detect a pattern of movement.

10. The method of claim 8 wherein one of the plurality of spot properties is color.

11. The method of claim 8 wherein one of the plurality of spot properties is shape.

12. The method of claim 8 wherein the commands to position the computer mouse pointer are generated only when the spot generated by the laser pointer is within a predetermined area of the image captured by the camera.

13. The method of claim 12 wherein the commands to position the computer mouse pointer are generated only when the spot generated by the laser pointer is within a first predetermined region of the image captured by the camera, the method further comprising generating a mouse click command for the computer when the spot generated by the laser pointer is within a second predetermined region of the image captured by the camera.

14. A method for generating computer commands to remotely control a computer using a laser pointer, the method comprising:

calibrating a camera connected to the computer and positioned to capture an image of video output from the computer by superimposing a plurality of fiducials as calibration marks on the projected display;

displaying video output from the computer;

superimposing a light pattern generated by the laser pointer onto the output from the computer;

capturing an image of the output and the light pattern generated by the laser pointer using the camera;

processing the image to determine position of the light pattern generated by the laser pointer relative to the video output from the computer; and generating computer commands based at least on a change in one of a plurality of user selectable properties and detection of movement of the light pattern generated by the laser pointer to control movement of a computer cursor.

15. The method of claim 14 wherein the step of displaying video output from a computer comprises projecting an image of the output on a remotely located screen.

16. The method of claim 14 wherein the step of displaying video output from a computer comprises displaying the video output on a monitor connected to the computer.

17. A computer presentation system for generating commands to remotely control a computer using an optical cursor generated by a hand-held pointer and projected on a screen displaying output from the computer, the system comprising:

a camera in communication with the computer for capturing an image of the screen including the projected output from the computer and the optical cursor generated by the hand-held pointer; and software executable by the computer for processing the image to determine position and one of a plurality of properties of the optical cursor generated by the hand-held pointer on the projected display, positioning a computer mouse pointer at a corresponding screen position on the projected display based on a detection of a pattern of movement of the optical cursor and to remotely control operation of the computer based on at least one property of the optical cursor, wherein the software generates a command when a change in one of the plurality of user selectable properties of the optical cursor occurs.

18. The computer presentation system of claim 17 wherein the software generates a command to control an application program running on the computer when a change in one of the plurality of properties of the optical cursor occurs.

19. The computer presentation system of claim 17 wherein the software generates a command to control an operating system of the computer when a change in one of the plurality of properties of the optical cursor occurs.

20. The computer presentation system of claim 17 wherein the software generates a command to superimpose calibration marks on the projected image to calibrate the image captured by the camera relative to the output from the computer.

21. A computer presentation system comprising:

a computer;

a monitor in communication with the computer for displaying output from the computer;

a projector for projecting the output from the computer onto a remotely located surface;

a hand-held optical pointer for generating an optical cursor having one or more user selectable properties and selectively superimposing the optical cursor on the remotely located surface; and a camera positioned to capture an image of at least a portion of the projected output from the computer, the camera being in communication with the computer, wherein the computer includes instructions for processing the image to determine position of the optical cursor within the projected image of the computer output, positioning a computer mouse pointer at the corresponding position of the computer output, and selectively generating a command when a programmable event occurs based on a change in one of a plurality of the user selectable properties of the cursor.

22. The system of claim 21 wherein the hand-held optical pointer comprises a laser pointer.

23. A computer presentation system comprising:

a computer having an associated monitor for displaying output from the computer;

a projector connected to the computer for projecting the output from the computer onto a remotely located surface;

a laser pointer for generating a plurality of properties using a user-selectable optical cursor and selectively superimposing the optical cursor on the remotely located surface; and a camera positioned to capture an image of the remotely located surface including at least a portion of the projected output from the computer, the camera being in communication with the computer;

wherein the computer includes instructions for calibrating the camera by projecting calibration fiducials onto the remotely located surface and processing the image of the remotely located surface to determine position and the properties of the optical cursor relative to the projected calibration fiducials to provide computer mouse cursor control and to control functioning of the computer based on a change in at least two properties of the optical cursor using the laser pointer.

24. A computer presentation system comprising:
a computer having a monitor for displaying output from the computer; and
means for capturing a projected image of the computer output having a superimposed cursor generated by a laser pointer and processing the image to determine position and a change in at least two properties of the cursor generated by the laser pointer relative to the projected image of the computer output to generate positioning and control commands emulating a conventional computer mouse.

25. A computer presentation system comprising:
a computer having an associated monitor for displaying output from the computer;
means for projecting the output from the computer onto a remotely located surface;
means for generating a user-selectable optical cursor having a plurality of properties which may be selectively superimposed on the remotely located surface; and
means for detecting position of the optical cursor relative to the output from the computer;
means for positioning a computer mouse cursor to a location corresponding to the detected pattern of movement of the optical cursor; and
means for detecting at least two user selectable characteristics of the optical pointer to generate a corresponding computer mouse command.

* * * * *